UNITED STATES PATENT OFFICE.

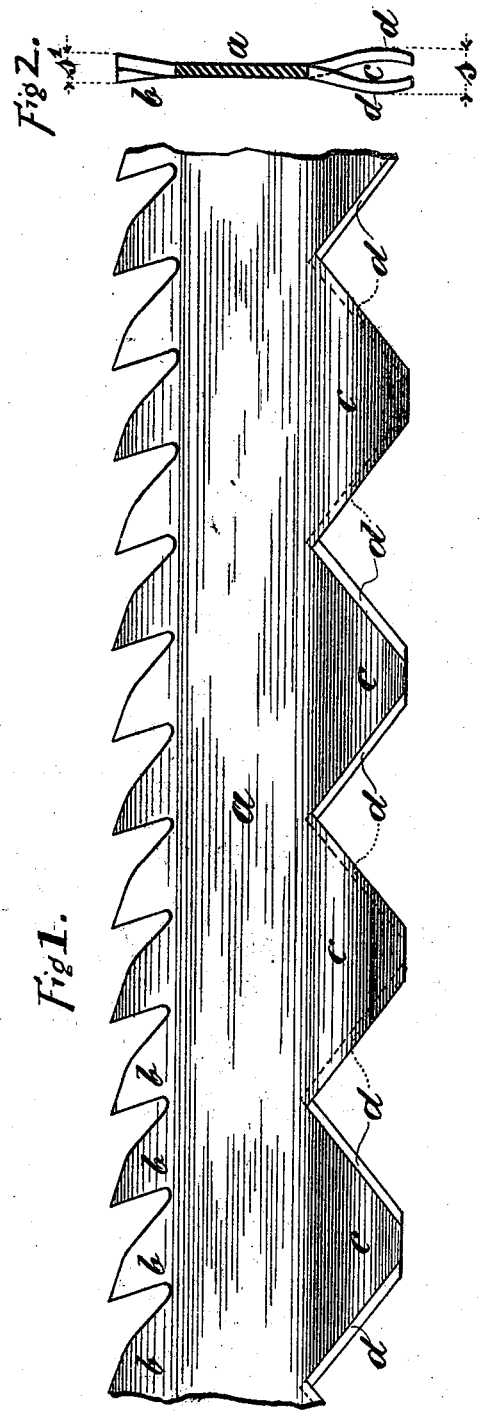

GEORG SZÉKELY, OF LUTILLA, AUSTRIA-HUNGARY.

SAW-BLADE.

SPECIFICATION forming part of Letters Patent No. 511,473, dated December 26, 1893.

Application filed May 26, 1893. Serial No. 475,564. (No model.)

*To all whom it may concern:*

Be it known that I, GEORG SZÉKELY, a subject of the Emperor of Austria, King of Hungary, residing at Lutilla, Austria-Hungary, have invented certain new and useful Improvements in Saw-Blades, of which the following is a description.

My invention relates to saw-blades and has for its purpose to provide a saw-blade that will not only act as an ordinary saw but will at the same time smooth the rough surfaces of the cut. To this end I have devised a saw-blade provided with the ordinary cutting teeth and equipped at the opposite edge with planing teeth that will smooth the rough surfaces of the cut during the motion of the saw.

In the drawings Figure 1 is a side view of my improved saw blade, and Fig. 2 is a vertical section through the same.

In the annexed drawings, which form a part of this specification, I have illustrated the new saw-blade in side and sectional view. The cutting edge of the saw is constructed in the well known manner, but on the opposite edge the saw-blade is provided with a set of planing teeth, $c$. These planing teeth $c$ are considerably larger than the cutting teeth $b$, are shaped in the form of trapezoids and are somewhat curved as distinctly shown in the drawings. The teeth are alternately curved to the right and the left, and are provided with sharp edges $d$ at one side or at both sides as may be preferred. In the first case they will of course only work during the upward or the downward stroke of the saw, in accordance with the arrangement of the sharp planing edges at the upper or lower side of the teeth. In the second case the planing will be performed during both the upward and the downward stroke of the saw. It is obvious, of course, that the set $s$ of the planing teeth must be somewhat larger than the set $s'$ of the cutting teeth, as plainly shown in the drawings.

I do not wish to limit myself to the exact shape of the teeth as shown and described as the same may manifestly be modified without departing from the scope of my invention.

Having now fully described my invention, what I claim as new, and desire to secure by Letters Patent, is—

1. A saw-blade provided with cutting teeth at one edge and with planing teeth at the opposite edge substantially as shown and described.

2. A saw-blade provided with planing teeth at the edge opposite to the cutting edge, said planing teeth being alternately curved in opposite direction and having a set somewhat larger than the set of the cutting teeth, substantially as and for the purpose described and set forth.

3. A saw-blade provided with planing teeth at the edge opposite to the cutting edge, said planing teeth being alternately curved in opposite direction and being sharpened at one or both edges substantially as and for the purpose described and set forth.

In witness whereof I have hereunto signed my name in the presence of two subscribing witnesses.

GEORG SZÉKELY.

Witnesses:
LOUIS GERSTER,
WILLIAM MÁRIÁSSY.